(12) United States Patent
Hutchinson et al.

(10) Patent No.: US 8,123,295 B2
(45) Date of Patent: Feb. 28, 2012

(54) CAR SEAT RECLINE MECHANISM WITH DOUBLE ACTING ACTUATOR

(75) Inventors: James M. F. Hutchinson, Mohnton, PA (US); Robert E. Haut, West Chester, PA (US); Gregory S. Sellers, Christiana, PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 168 days.

(21) Appl. No.: 12/554,617

(22) Filed: Sep. 4, 2009

(65) Prior Publication Data

US 2010/0007187 A1 Jan. 14, 2010

Related U.S. Application Data

(63) Continuation-in-part of application No. 11/953,062, filed on Dec. 9, 2007, now Pat. No. 7,735,921.

(60) Provisional application No. 61/191,607, filed on Sep. 10, 2008.

(51) Int. Cl.
*A47D 1/10* (2006.01)
(52) U.S. Cl. .............................. 297/256.13; 297/256.14
(58) Field of Classification Search ............. 297/256.13, 297/256.1, 256.14; 248/407, 423
See application file for complete search history.

(56) References Cited

U.S. PATENT DOCUMENTS

| 4,754,999 | A | | 7/1988 | Kain ........................ 297/256.14 |
| 5,058,283 | A | * | 10/1991 | Wise et al. ...................... 33/371 |
| 5,625,956 | A | * | 5/1997 | Cone et al. ...................... 33/370 |
| 5,746,478 | A | * | 5/1998 | Lumley et al. ........... 297/256.13 |
| 6,322,142 | B1 | * | 11/2001 | Yoshida et al. ............ 297/250.1 |
| 6,682,143 | B2 | | 1/2004 | Amirault .................... 297/250.1 |
| 6,746,080 | B2 | * | 6/2004 | Tsugimatsu et al. ..... 297/256.13 |
| 7,328,948 | B2 | * | 2/2008 | Konig et al. ............... 297/256.1 |

\* cited by examiner

*Primary Examiner* — Milton Nelson, Jr.
(74) *Attorney, Agent, or Firm* — Miller Law Group, PLLC

(57) ABSTRACT

A car seat is constructed with a car seat member on which the child is transported and a separable base member that is mounted to the vehicle seat via the vehicle seat belt or latch anchor which is passed through side openings in the base member and trapped in a belt latch apparatus to secure the base member to the vehicle seat. The car seat member includes a recline actuation linkage formed with two pivotally mounted link members interconnected so that the upward movement of the recline actuator is translated into an intuitive release of the recline mechanism for adjustment of the recline angle of the car seat member relative to the base member. A level indicator is mounted on the car seat member to provide a positive feedback that the proper orientation of the car seat member has been selected for the rear facing configuration.

19 Claims, 11 Drawing Sheets

Fig. 2
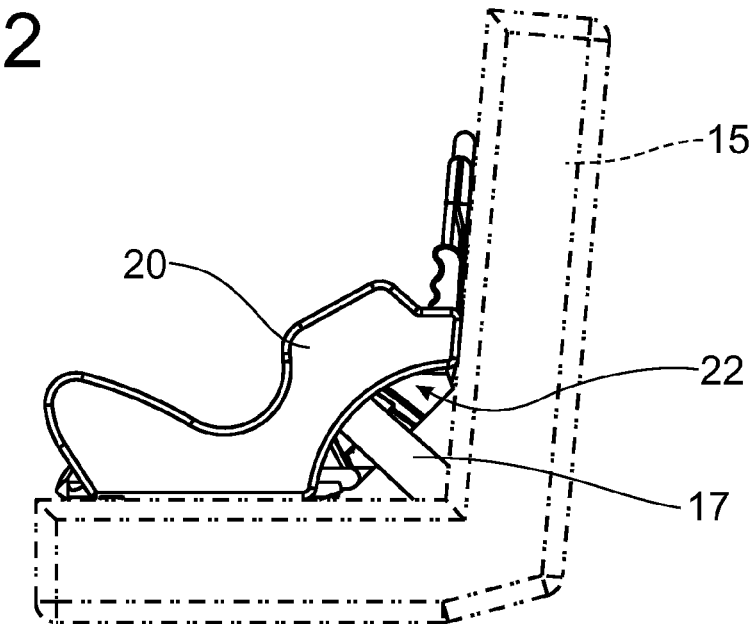
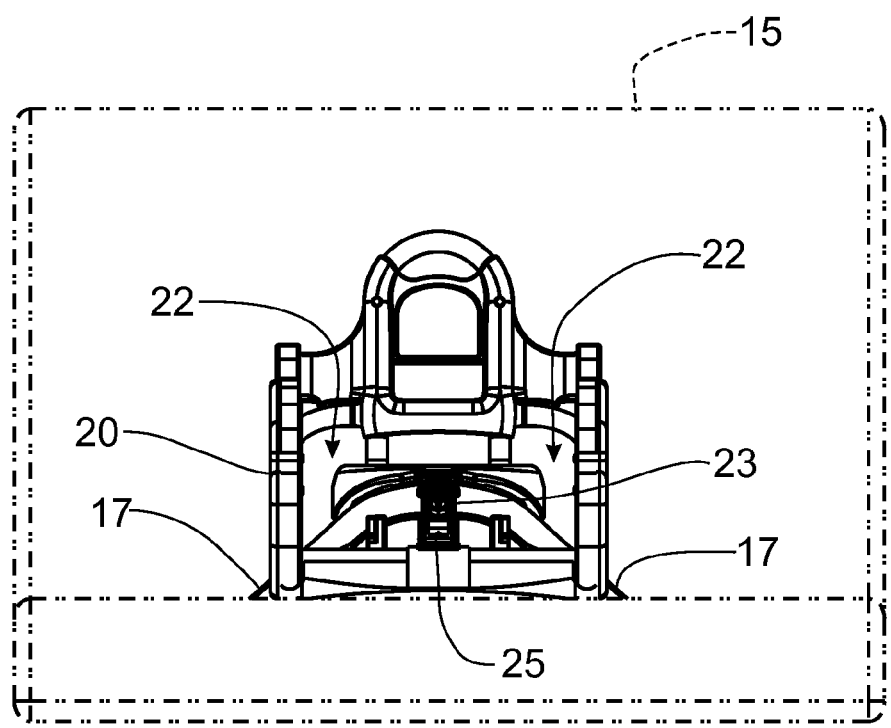
Fig. 3

Fig. 5
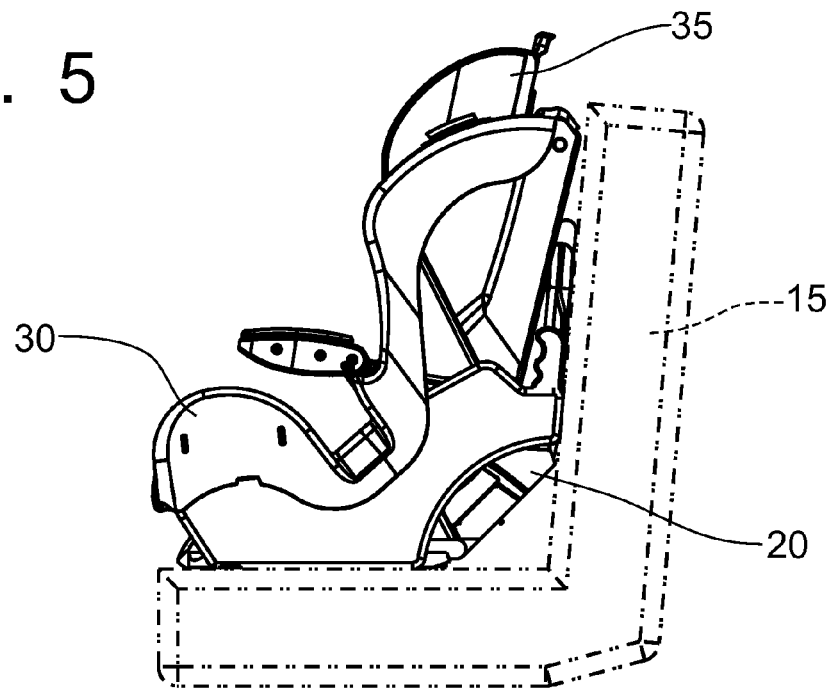
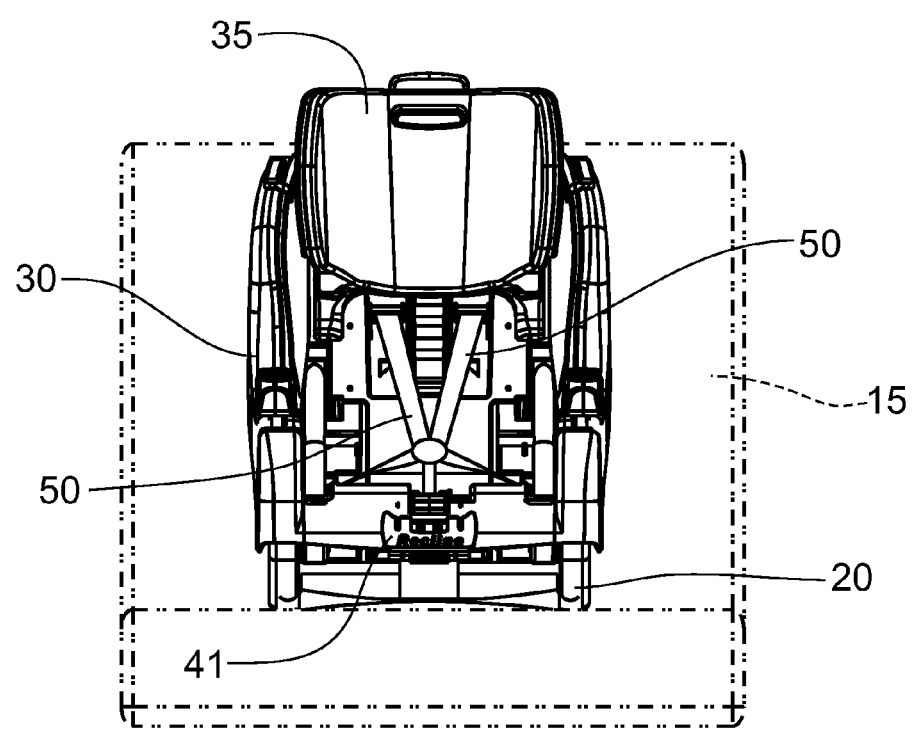
Fig. 6

Fig. 10
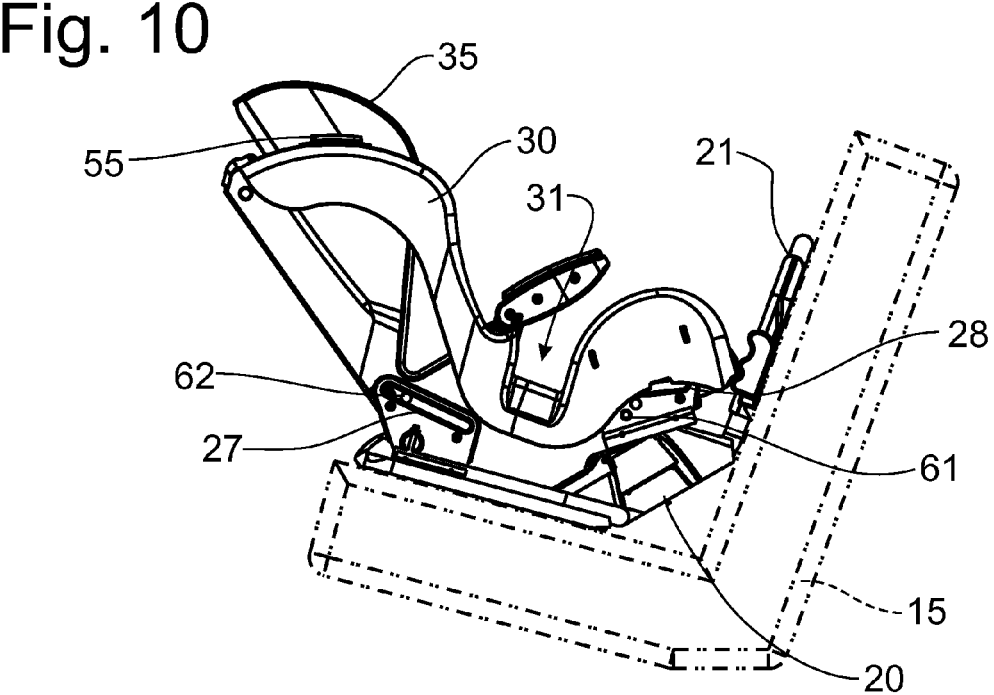
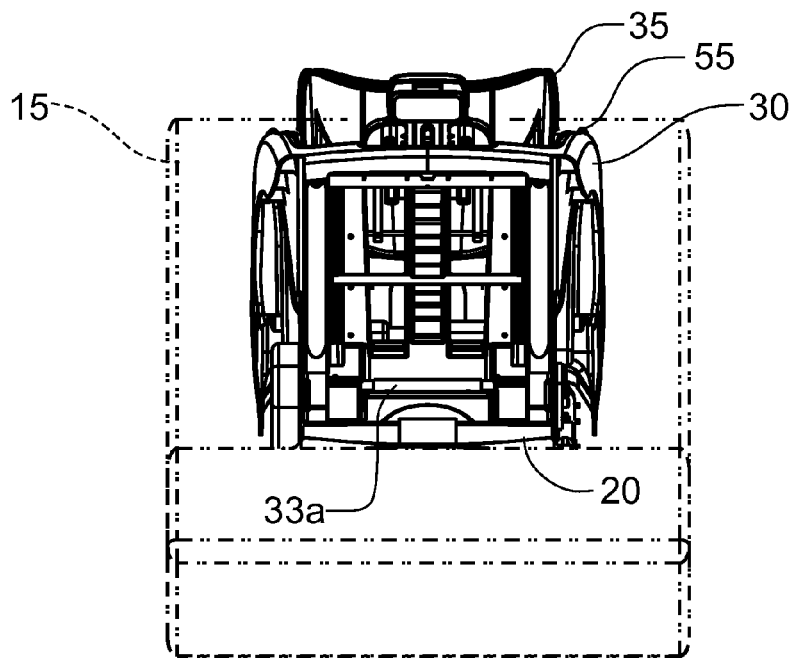
Fig. 11

CAR SEAT RECLINE MECHANISM WITH DOUBLE ACTING ACTUATOR

CROSS-REFERENCE TO RELATED APPLICATIONS

This application is a continuation-in-part of U.S. patent application Ser. No. 11/953,062, filed on Dec. 9, 2007, now U.S. Pat. No. 7,735,921 and claims domestic priority on U.S. Provisional Patent Application Ser. No. 61/191,607, filed on Sep. 10, 2008, the contents of which are incorporated herein by reference.

FIELD OF THE INVENTION

The present invention relates generally to a car seat for use in transporting children in an automobile, and, more particularly, to a recline system for the car seat to adjust the relative position of the car seat on an independent base member.

BACKGROUND OF THE INVENTION

Car safety seats for children are commercially available in a many configurations corresponding to differences in the age, weight, and size of the child being transported. Parents can choose a car seat that is not only the correct size, but also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who don't want to be seen sitting in a "baby seat" like this option and parents don't have to manage a big bulky car seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

The basic purpose of a child's car seat is to protect the child in case the vehicle in which the car seat is mounted is involved in a crash event. Protecting the child involves limiting excursion and controlling the forces exerted on the child from the vehicle undergoing a crash event. Improper installation of a car seat is a major factor in a loss of protection for the child. If the car seat requires a complicated or complex belt path along which the vehicle seat belt is positioned to secure the car seat to the vehicle seat, the likelihood that the car seat will be properly installed is diminished. A belt path for the vehicle seat belt that is more visible and easier to access will increase the likelihood that the car seat will have a tight, proper installation.

During the first year of the life of a baby, the child should be positioned in a car seat in a manner to be facing rearwardly. When the child is over a year old, the child can be placed in the car seat in a manner that the child is facing forwardly. Presently known car seats require a remounting of the car seat and a repositioning of the vehicle seat belt to accomplish this conversion in orientation or the substitution of a different and larger car seat. Each time the car seat is reconfigured or moved from one vehicle to another, a new opportunity to improperly mount the car seat on the vehicle seat is presented, which can be aggravated by a non-intuitive, complicated belt path for mounting the car seat.

Many child car seats provide options for reclining the seat relative to the vehicle seat on which the car seat is mounted. Most known child car seats require a readjustment of the vehicle seat belt when changes are made to the recline orientation of the car seat. Readjusting the vehicle seat belt is an inconvenience to the person making the recline adjustment and provides an additional opportunity for the car seat to become improperly installed, which would not provide the optimum safety for the child positioned within the car seat. Some sources estimate that over 80% of car seats are incorrectly installed and proper car seat installation is essential for the car seat to protect the occupant.

In the rear facing mode, a baby must be oriented at a certain angle in order for the infant to breathe correctly while being positioned correctly in the event of a crash. If the car seat is too upright when in the rear facing mode, the baby's head can fall forward and occlude the child's airway. If the car seat is reclined too much, the infant can incur high loads on the neck and shoulders through the harness straps which prevent the baby from exiting the top of the car seat in the event of a collision. In the forward facing mode, a car seat that is too upright will cause a child to be uncomfortable on long trips, particularly when the child wants to sleep. A car seat that is mounted on a separate base and has the ability to change the angle of the car seat relative to the base must be able to stay locked at the selected angle in the event of a crash. Having the ability to recline the car seat easily to the correct position and lock the car seat in that selected position is necessary for the safety and comfort of the child.

It would also be desirable to provide a child car seat that has a recline mechanism that is cooperable with the separate base part to adjust the angle of the car seat relative to the base. Preferably, the recline mechanism would be intuitively operable, preferably by pulling up on the recline actuator handle to cause the recline mechanism to disengage and permit an adjustment of the recline angle. It would also be desirable to incorporate a level indicator to provide a positive feedback that the car seat has been correctly installed on the vehicle.

SUMMARY OF THE INVENTION

It is an object of this invention to provide a recline mechanism for a car seat for transporting children in an automobile that utilizes a double pivot configuration to transfer an upward motion for the recline actuator to an upward release movement of the recline tube from the recline rack.

It is another object of this invention to provide a recline mechanism that has the recline actuation linkage on the car seat to be engagable with a recline rack formed on the base member that is separable from the car seat.

It is a feature of this invention that the independent and separable base member is formed with a central located recline rack positioned to be engagable with the recline actuation linkage in the car seat.

It is an advantage of this invention that the upward movement of the recline actuator translates into a release of the recline linkage from the recline rack on the base member.

It is another advantage of this invention that the operation of the recline actuator is intuitive.

It is another feature of this invention that the recline actuation linkage is formed with a pair of pivotally mounted link members so that an upward movement of the recline actuator results in an upward movement of the distal end of the second link member bearing the recline lock tube for movement away from the recline rack in the base member.

It is still another feature of this invention that the car seat is formed with a level indicator mounted at a location to permit an easy observance of the level indicator.

It is still another advantage of this invention that the level indicator is positioned so that the level indicator shows the proper orientation of the car seat for a rear facing configuration.

It is yet another feature of this invention that the car seat can be positionally adjusted relative to the base member, which is secured to the vehicle seat, to orient the car seat at the proper angle when in the rear facing configuration.

It is yet another advantage of this invention that the positive feedback provided by the level indicator enhances the likelihood that the car seat has been correctly installed on the vehicle seat.

It is a further advantage of this invention that the intuitive utilization of the recline actuator makes it easier for the caregiver to positionally adjust the angle of the car seat relative to the base member and the vehicle seat for proper installation of the car seat.

It is a further feature of this invention that the recline actuation linkage is spring biased to lock the recline tube into engagement with the recline rack It is yet another object of this invention to provide a recline mechanism for a car seat having a base member separable from a car seat member, which is durable in construction, inexpensive to manufacture, carefree of maintenance, facile in assemblage, and simple and effective in use.

These and other objects, features and advantages are accomplished according to the instant invention by providing a car seat having a car seat member on which the child is transported and a separable base member that is mounted to the vehicle seat via the vehicle seat belt or latch anchor which is passed through side openings in the base member and trapped in a belt latch apparatus to secure the base member to the vehicle seat. The car seat member includes a recline actuation linkage formed with two pivotally mounted link members interconnected so that the upward movement of the recline actuator is translated into an intuitive release of the recline mechanism for adjustment of the recline angle of the car seat member relative to the base member. A level indicator is mounted on the car seat member to provide a positive feedback that the proper orientation of the car seat member has been selected for the rear facing configuration.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a left side elevational view of the base member shown in FIG. 1, the representative vehicle seat being shown in phantom;

FIG. 3 is a front elevational view of the base member shown in FIG. 1;

FIG. 5 is a left side elevational view of the seat mounted on the base member, as shown in FIG. 4, the representative vehicle seat being shown in phantom;

FIG. 6 is a front elevational view of the seat mounted on the base member, as depicted in FIGS. 4 and 5;

FIG. 10 is a left side elevational view of the seat mounted on the base member, as shown in FIG. 9, the representative vehicle seat being shown in phantom;

FIG. 11 is a front elevational view of the seat mounted on the base member, as depicted in FIGS. 9 and 10;

DETAILED DESCRIPTION OF THE PREFERRED EMBODIMENT

Figure 1:
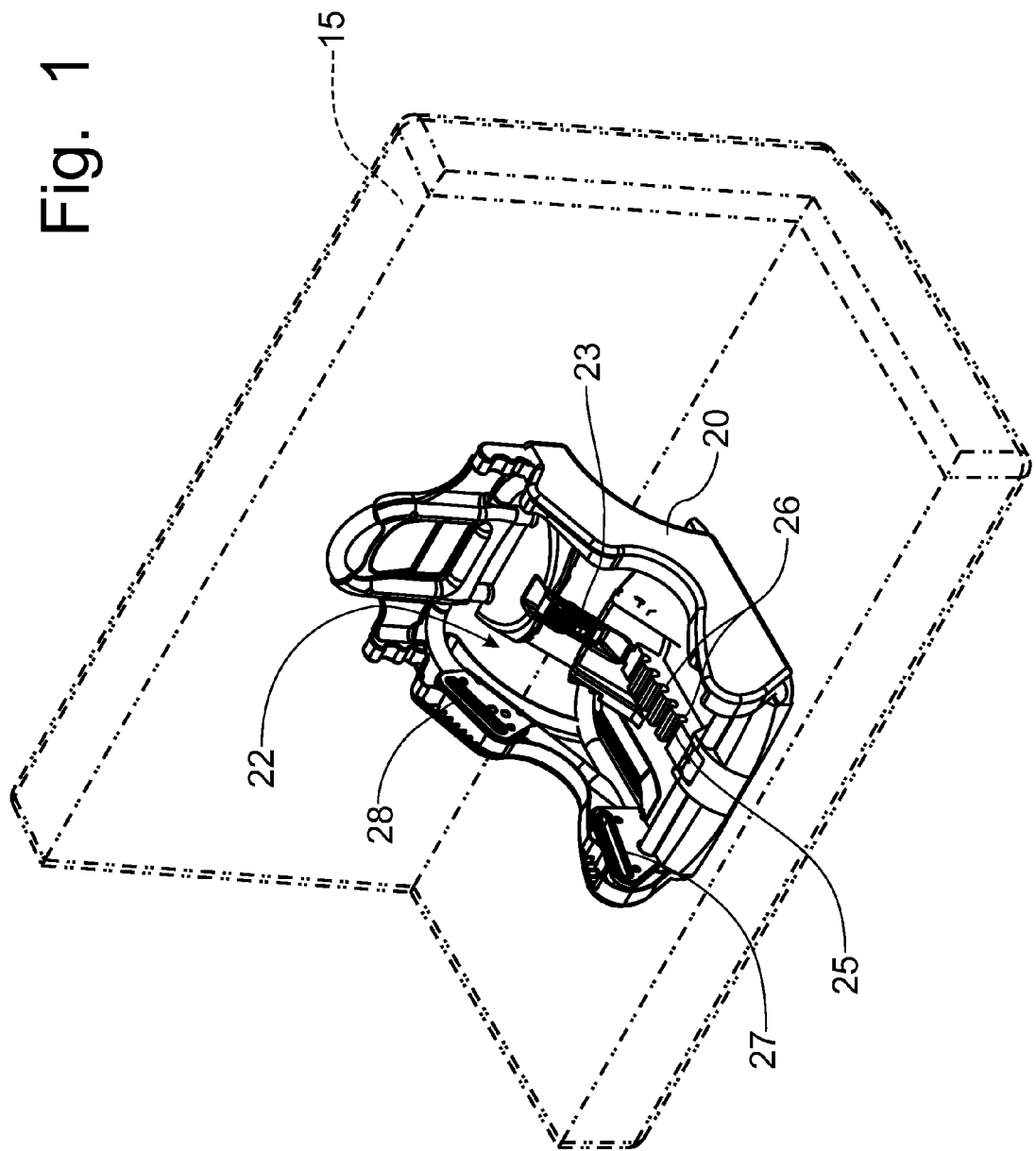
FIG. 1 is an upper, front perspective view of a base member, incorporating the principles of the instant invention, mounted on a representative vehicle seat, shown in phantom.

Referring now to FIGS. 1-11, a car seat incorporating the principles of the instant invention can best be seen. The car seat 10 can be configured in a number of different positions, as will be described in greater detail below, and is formed of a seat member 30 detachably mounted on a base member 20. As is best seen in FIGS. 1-3, the base member 20 is a separate member that is affixed to a vehicle seat 15, representatively shown in phantom, by the seat belt 17 of the vehicle. The vehicle seat belt 17 is pulled through a first side opening 22, across a saddle bearing a seat belt latch member 23 and out through the second side opening 22 to be connected to the vehicle seat belt latch member (not shown) and pull tight to capture the base member 20 on the vehicle seat 15. The seat belt latch member 23 secures the vehicle seat belt 17 to the base member 20 and is selectively movable to release the vehicle seat belt 17 from engagement with the base member 20.

Figure 4:
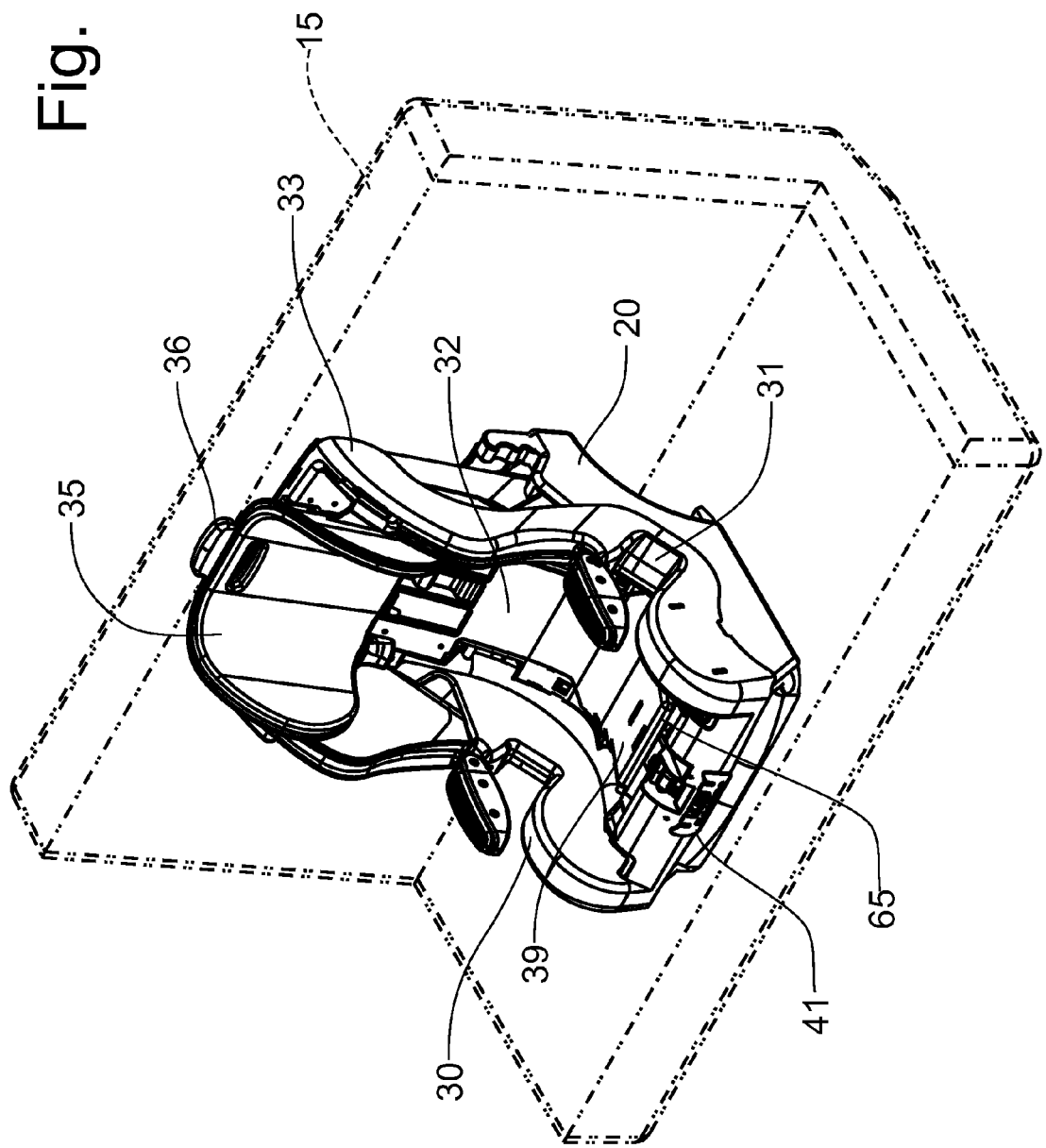
FIG. 4 is an upper, front perspective view, similar to that of FIG. 1, but showing a seat member incorporating the principles of the instant invention mounted on the base member in a forward-facing orientation with the seat positioned in a fully upright position, the representative vehicle seat being shown in phantom.
Figure 7:
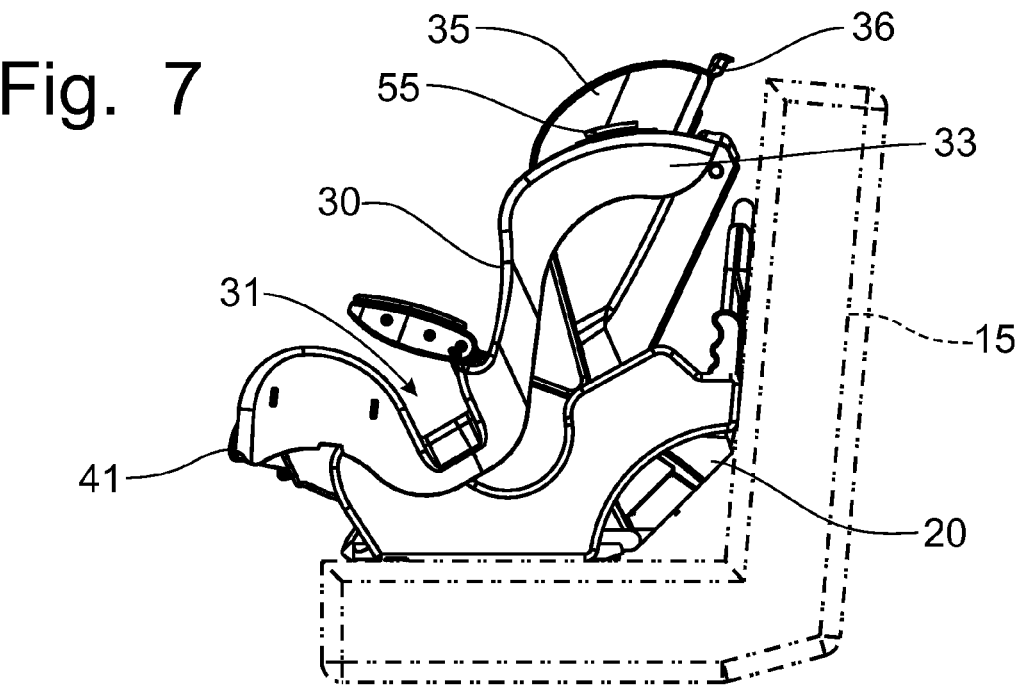
FIG. 7 is a left side elevational view similar to that of FIG. 5, but showing the forward facing seat member in a reclined position relative to the base member.
Figure 8:
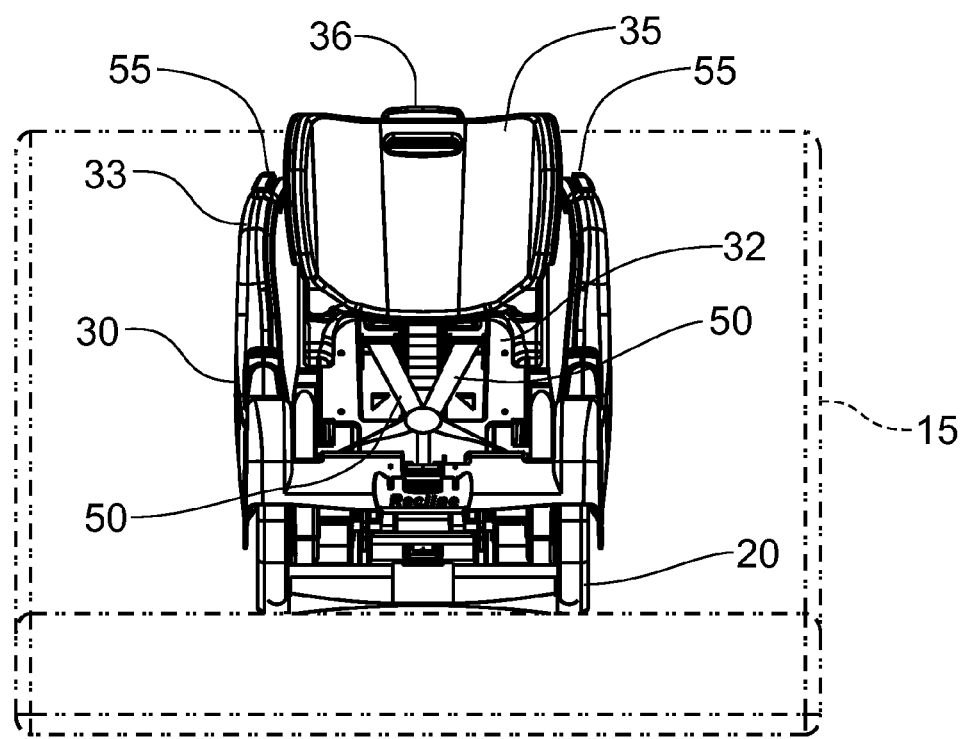
FIG. 8 is a front elevational view of the reclined seat member shown in FIG. 7, the representative vehicle seat being shown in phantom.

The base member 20 is formed with a central rack member 25 having a plurality of parallel, horizontally disposed notches 26 to cooperate with the recline apparatus 40, described in greater detail below to change the recline position of the seat member 30 on the base member 20. The base member 20 is also formed with two pairs of opposing recline control slots 27, 28 into which retractable latch pins 61, 62 are engagable to secure the seat member 30 to the base member 20. The lower recline control slots 27 are positioned at a forward portion of the base member 20 and are oriented generally horizontally. The upper recline control slots 28 are located at a rearward portion of the base member 20, but are oriented at an inclined angle compared to the lower recline control slots 27. As a result, the rearward portion of the seat member 30 will lower as the forward portion of the seat member 30 moves forwardly to create a reclined orientation for the seat member 30. The upright configuration of the seat member 30, corresponding to the latch pins 61, 62 being positioned in the rearwardmost portions of the recline control slots 27, 28, is shown in FIGS. 4-6, while the recline configuration of the seat member 30, corresponding to the latch pins 61, 62 being positioned in the forwardmost portions of the recline control slots 27, 28, is depicted in FIGS. 7 and 8.

Figure 9:
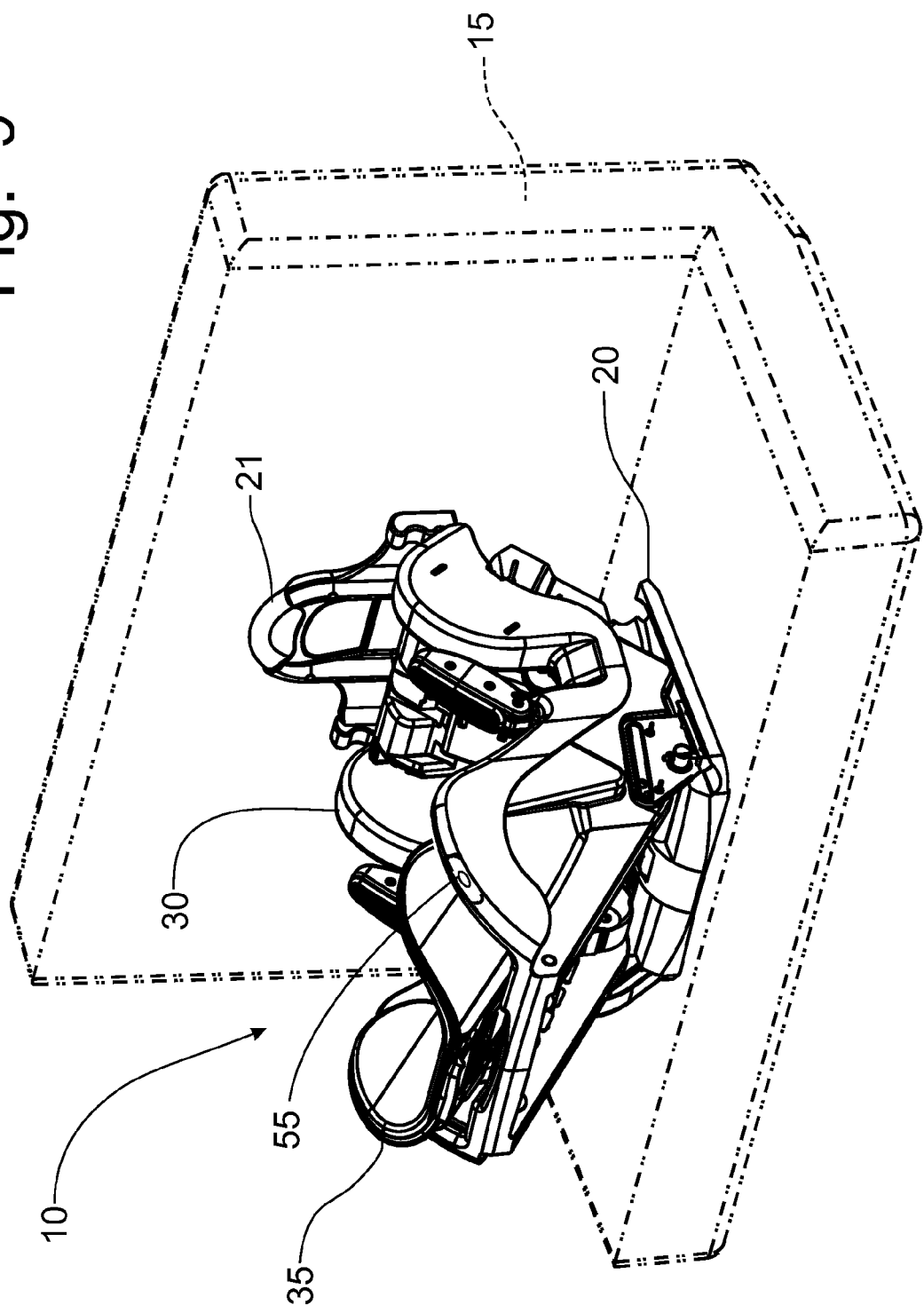
FIG. 9 is an upper, front perspective view, similar to that of FIG. 4, but showing the seat member mounted on the base member in a rear-facing orientation, the representative vehicle seat being shown in phantom.
Figure 12:
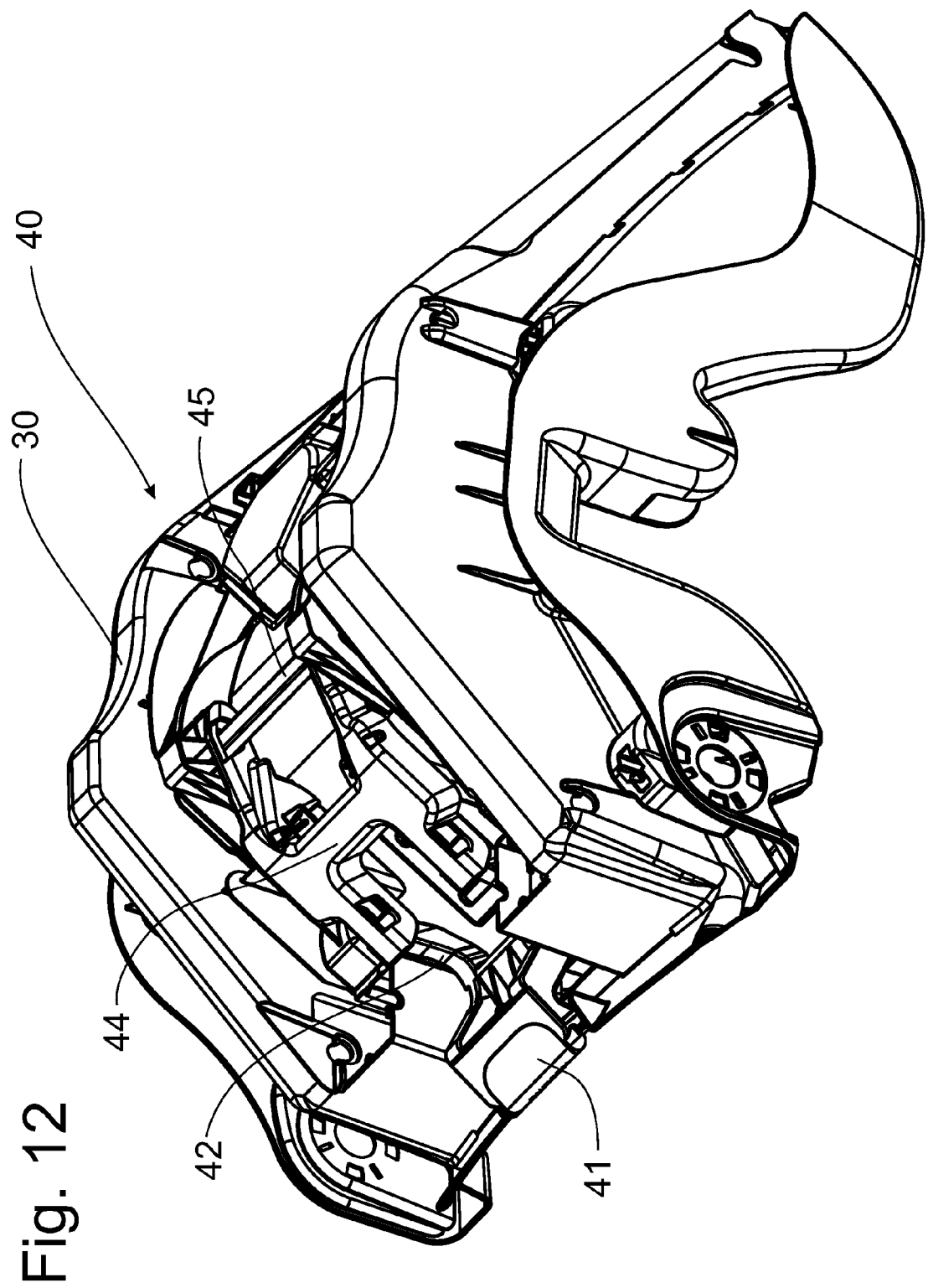
FIG. 12 is an enlarged bottom perspective view of the car seat member to shown the recline actuation linkage.
Figure 13:
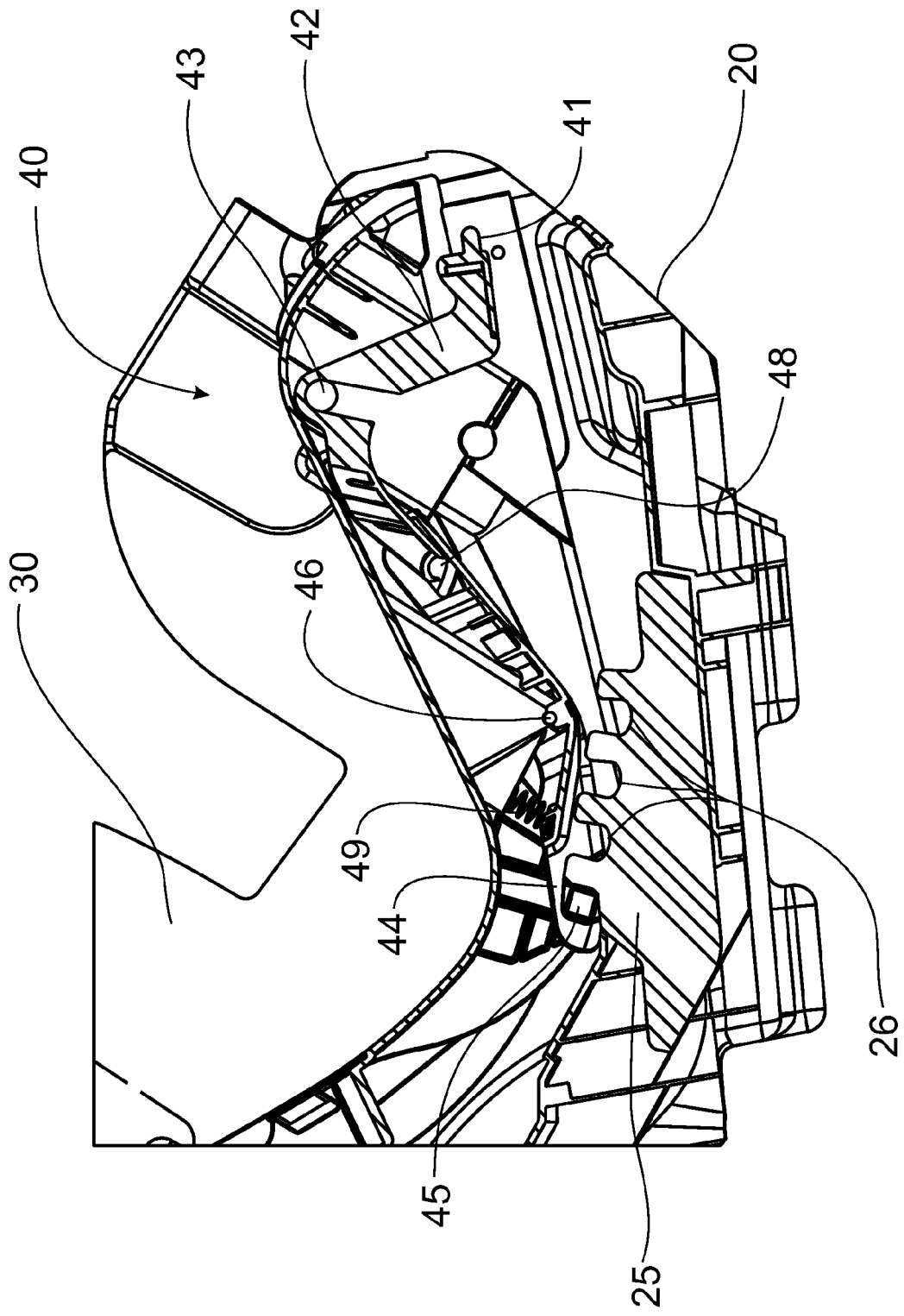
FIG. 13 is a schematic cross-sectional view through the car seat assembly with the car seat member mounted on the base member in a forward facing configuration to show the recline actuation linkage in a locked position.

The car seat member 30 is constructed with a generally horizontal seat member 39 defining a seating surface for the occupant, and a generally vertical seat back 32 projecting upwardly from the rear of the seat member 39. A head rest 35 can be mounted on the top of the seat back 32 and is preferably vertically adjustable through manipulation of the actuation handle 44 at the top of the head rest to accommodate growth in the child using the car seat 10. The car seat member 30 can be mounted onto the base member 20 in either a forward-facing orientation, such as is depicted in FIG. 4, or in a rearwardly-facing orientation, as is shown in FIGS. 9-11. The seat member 30 includes two pairs of latch members 61, 62 that are retractable in conjunction with the movement of the actuator handle 65 at the bottom of the seat member 30. The movement of the actuator handle 65 is operable to cause a retraction of the latch pins 61, 62 into the body of the seat member 30 until the seat member 30 is properly positioned onto the base member 20, whereupon the latch pins 61, 62 are allowed to extend into the respective lower and upper recline control slots 27, 28 to trap the seat member 30 on the base member 20.

The positioning of the seat member 30 onto the base member 20 places the recline apparatus 40 into engagement with the recline rack 25 to prevent the latch members, or latch pins, 61, 62 from sliding along the corresponding recline control slots 27, 28. The seat member 30 is configured such that the seat member 30 can be used as a belt positioning booster seat for larger children by removing the base member 20 from the vehicle seat 15 and placing the seat member 30 directly on the vehicle seat 15 so that the vehicle seat belt 17 will pass around both the seat member 30 and the child positioned thereon by passing through a cutout slot 31.

The recline apparatus 40 is operated through manipulation of the actuation handle 41 located at the forward portion of the car seat member 30. As is best seen in FIGS. 12-15, the actuator handle 41 is the forward end of a first link member 42 pivotally connected to the car seat member 30 by a first pivot 43. The first link member 42 is pivotally connected by a pivot 48 to a second link member 44 also pivotally supported on the car seat member 30 by a second pivot 46. The pivotal connection 48 between the first and second link members 42, 44 provides for linear translation between the link members 42, 44. The rearward end of the second link member 44 bears the recline lock tube 45 that is movable into and out of engagement with the control rack 25 in the base member 20. When the recline lock tube 45 is received within one of the notches 26 in the recline control rack 25, the angular position of the car seat member 30 is locked with respect to the base member 20. The release of the recline lock tube 45 from the control rack 25 allows the car seat member 30 to be moved on said base member 20 into a new recline angle.

Figure 14:
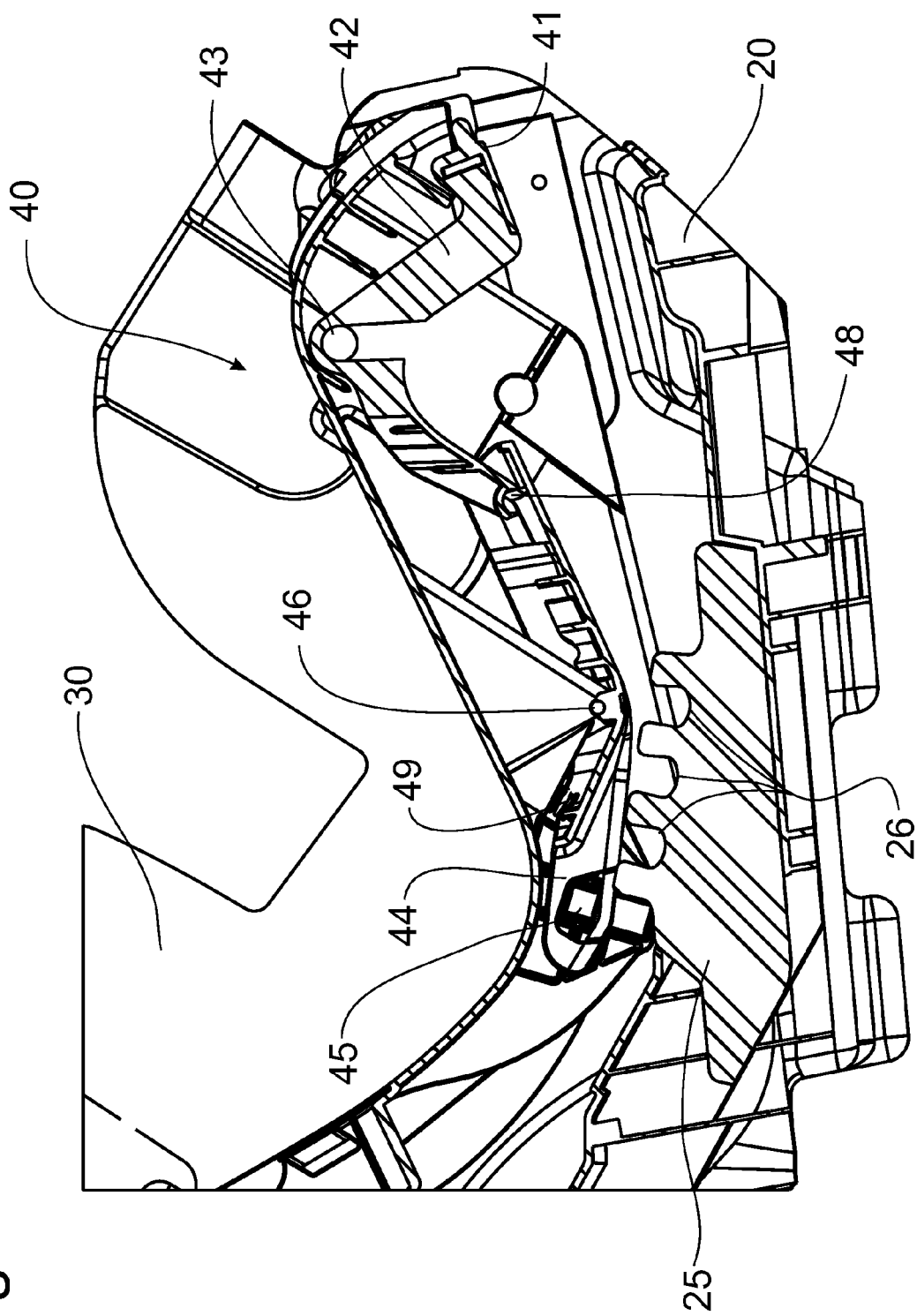
FIG. 14 is a schematic cross-sectional view similar to that of FIG. 13, but with the recline actuation linkage moved into the release position to allow the movement of the car seat member relative to the base member.

Accordingly, a lifting of the actuation handle 41 to the release position shown in FIG. 14 pivots the first link member 42 to cause a resultant pivoting of the second link member 44 to affect a raising of the recline lock tube 45 from the control rack 25. When a new desired recline position of the car seat member 30 has been selected, the operator need only release the actuation handle 41 and the spring bias supplied by the spring 49 returns the recline lock tube 45 into engagement with the corresponding notch 26 in the recline control rack 25 and a lowering of the actuation handle 41 to the locked position. The upward movement of the actuation handle 41 to affect a release of the recline lock tube 45 from the recline control rack 25 is intuitive and facilitates the usage of the recline apparatus 40 for the proper positioning of the car seat member 30 on the base member 20.

Figure 15:
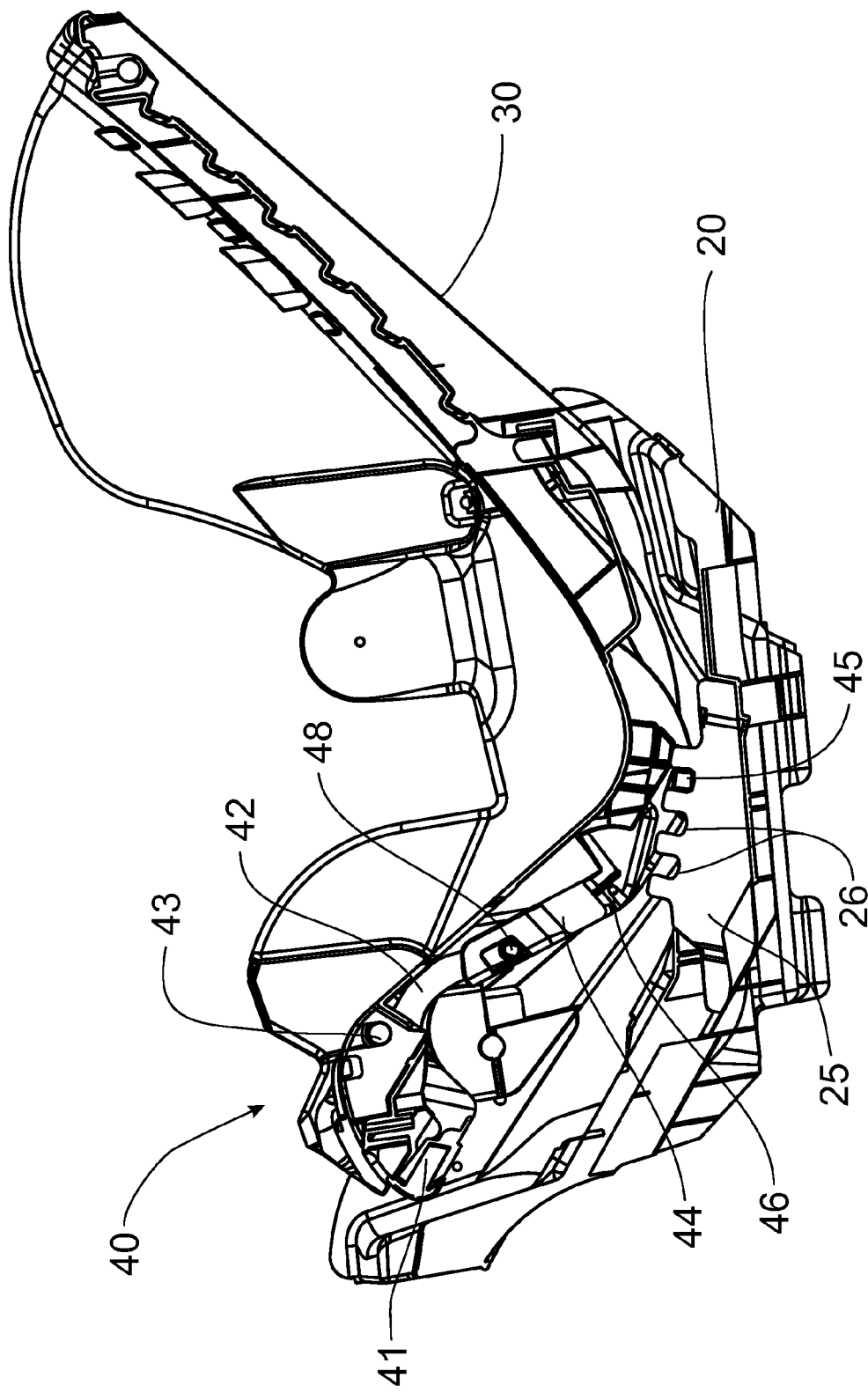
FIG. 15 is a schematic cross-sectional view similar to that of FIG. 13 but showing the car seat member in a rear facing configuration and the recline actuation linkage in the locked position.

The recline apparatus 40 is also operable when the car seat member 30 is positioned on the base member 20 in a rear facing orientation, as is depicted in FIG. 15. As noted above with respect to the forward facing orientation, the recline apparatus 40 is operable to control the recline angle of the car seat member 30 relative to the base member 20. As is reflected in a comparison of the rearwardly facing car seat member 30 shown in FIG. 9 versus the rearwardly facing car seat member 30 depicted in FIG. 10, the vehicle seat 15 can be substantially different from one vehicle to another. The proper positioning of a rearwardly facing car seat member 30 is important in the health and comfort of an infant supported in the car seat member 30. If the recline angle is too high, the child's head can fall forward and obstruct breathing, and if the recline angle is too low, the infant can suffer head, neck and shoulder injuries from the forces exerted by the five-point harness 50 on the infant to restrain the infant on the seat in the event of crash.

To facilitate the proper positioning of the car seat member 30, particularly when the car seat member 30 is placed into the rear facing orientation, a level indicator 55 is mounted on the car seat member 30 at a position that is easily observed by the caregiver installing the car seat member 30 and where the level indicator 55 would provide a positive indication that the car seat member 30 has been positioned at the correct angle for safe transport of an infant. Once such position, as is demonstrated in FIG. 10, is on the shell 33 of the car seat member 30 at the top of the seat back 32.

In operation, once the base member 20 has been securely installed onto the vehicle seat 15, the car seat member 30 can be mounted on the base member 20 in a rear facing configuration. The recline actuator handle 41 can then be lifted to release the recline lock tube 45 from the control rack 25 and the car seat member 30 positionally adjusted relative to the base member 20 until the level indicator 55 show a "level" orientation. While the car seat member 30 is not actually level, the level indicator 55 provides a positive feedback from the level position of the level indicator 55 that the car seat member 30 has not been positioned in the correct angle for proper transport of an infant. The recline actuator handle 41 can then be released so that the recline lock tube 45 will drop into the corresponding notch 26 in the recline control rack 25 to lock the car seat member 30 in the selected recline position. Accordingly, once the caregiver has the car seat member 30 positioned in the rear facing orientation, the level indicator 55 allows for easy adjustment of the orientation of the car seat member 30 through the recline mechanism 40 to position the level indicator 55 into an acceptable position without a need to uninstall the car seat member 30 to find the proper angle. Furthermore, the operation allows user for a much more intuitive and natural action.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A recline adjustment mechanism for use on a child's car seat having a car seat member supported on a base member for selective positional movement relative to the base member through a plurality of recline angles, comprising:
   a control rack having a plurality of notches therein corresponding to said plurality of recline angles; and
   a recline latch mechanism selectively engaging said control rack to lock said car seat member into a selected recline angle, said recline latch mechanism including:
      a first link member having first and second ends and being pivotally supportable on said car seat member by a first pivot positioned intermediate said first and second ends of said first link member, said first link member being movable between a home position and a release position; and
      a second link member having a proximal end and a distal end and being pivotally supportable on said car seat member by a second pivot positioned intermediate said proximal and distal ends, said second link member being movably connected to said second end of said first link member at said proximal end thereof and connecting a recline lock at said distal end thereof, said recline lock being engagable with said control rack to fix said car seat member at a selected recline angle.

2. The recline adjustment mechanism of claim 1 further comprising a spring bias mechanism operatively connected to said recline latch mechanism to bias said recline lock into engagement with said control rack.

3. The recline adjustment mechanism of claim 2 wherein said spring bias mechanism includes a spring for interconnecting said car seat member and said second link member to bias said first link member toward said home position.

4. The recline adjustment mechanism of claim 2 wherein said first link member terminates in an actuation handle at said first end, such that said actuation handle is accessible externally of said car seat member, said actuation handle being movable between a lowered locked position, in which said recline lock is secured into engagement with said control rack, and a raised release position in which said recline lock is disengaged from said control rack.

5. The recline adjustment mechanism of claim 4 wherein said spring bias mechanism biases said actuation handle into said lowered locked position.

6. The recline adjustment mechanism of claim 1 wherein said car seat member is selectively positionable on said base member in a forward facing orientation and in a rear facing orientation.

7. The recline adjustment mechanism of claim 6 wherein said car seat member has an indicator mounted thereon to provide an indication of said car seat member being positioned in a recommended recline angle for an infant in said rear facing orientation of said car seat member.

8. The recline adjustment mechanism of claim 7 wherein said indicator is a level indicator mounted on said car seat member.

9. A child safety seat for use in a vehicle, comprising:
   a base member;
   a car seat member mounted on said base member and being selectively positionable in a forward facing orientation and a rear facing orientation, said car seat member being selectively movable relative to said base member through a plurality of recline angles; and
   a recline control mechanism including:
      a control rack formed on said base member and having a plurality of notches therein corresponding to said plurality of recline angles;
      a first link member pivotally supported on said car seat member by a first pivot such that said first link member is movable with said car seat member; and
      a second link member pivotally supported on said car seat member by a second pivot member pivotally connected at an intermediate portion of said second link member such that said second link member is also movable with said car seat member, said second link member being pivotally interconnected with said first link member at a first end thereof and to a recline lock at a distal end thereof, said recline lock being selectively engagable with one of the notches of said control rack to fix said car seat member at a selected recline angle.

10. The child safety seat of claim 9 wherein said car seat member has an indicator mounted thereon to provide an indication of said car seat member being positioned in a recommended recline angle for an infant in said rear facing orientation of said car seat member.

11. The child safety seat of claim 10 wherein said indicator is a level indicator mounted on said car seat member at a position that is level when said car seat member is positioned in said rear facing orientation and at said recommended recline angle.

12. The child safety seat of claim 11 wherein said car seat member has a seat member and a seat back projecting upwardly from said seat member, said indicator being located at an upper portion of said seat back.

13. The child safety seat of claim 9 further comprising a spring bias mechanism operatively connected to said recline control mechanism to bias said recline lock into engagement with said control rack.

14. The child safety seat of claim 13 wherein said spring bias mechanism includes a spring interconnecting said car seat member and said second link member.

15. The child safety seat of claim 14 wherein the first link member terminates in an actuation handle accessible externally of said car seat member, said spring biasing said actuation handle into a lowered locked position, said actuation handle being movable into a raised release position to disengage said recline lock from said control rack.

16. A child safety seat for use in a vehicle, comprising:
   a base member;
   a car seat member mounted on said base member and being selectively positionable in a forward facing orientation and a rear facing orientation, said car seat member having a seat member and a seat back connected to said seat member, said car seat member being selectively movable relative to said base member through a plurality of recline angles;

a recline mechanism operably interconnecting said car seat member and said base member to control the movement of said car seat member relative to said base member through said recline angles, said recline mechanism including:

a control rack formed on said base member and having a plurality of notches therein corresponding to said plurality of recline angles;

a first link member pivotally supported on said car seat member and terminating in an actuation handle accessible externally of said car seat member for movement between a home position and a raised release position; and a second link member pivotally supported on said car seat member and being connected to said first link member at a first end thereof and supporting a recline lock tube at a distal end thereof, said recline lock tube being engagable with said control rack to fix said car seat member at a selected recline angle; and an indicator mounted on said car seat member to provide an indication of said car seat member being positioned in a recommended recline angle for an infant in said rear facing orientation of said car seat member, said indicator being a level indicator positioned on said car seat member at an upper portion of said seat back.

17. The child safety seat of claim 16 wherein said indicator is a level indicator mounted on said car seat member at a position that is level when said car seat member is positioned in said rear facing orientation and at said recommended recline angle.

18. The child safety seat of claim 16 further comprising a spring bias mechanism operatively connected to said recline latch mechanism to bias said recline lock tube into engagement with said control rack.

19. The child safety seat of claim 18 wherein said spring bias mechanism includes a spring interconnecting said car seat member and said second link member, said spring bias mechanism biasing said actuation handle into a lowered locked position, said actuation handle being movable into a raised release position to disengage said recline lock tube from said control rack.

* * * * *